US010701018B2

(12) United States Patent
Jabara et al.

(10) Patent No.: US 10,701,018 B2
(45) Date of Patent: *Jun. 30, 2020

(54) SYSTEM AND METHOD FOR CUSTOMIZED MESSAGE DELIVERY

(71) Applicant: Mobilitie, LLC, Newport Beach, CA (US)

(72) Inventors: Gary B. Jabara, Irvine, CA (US); Lloyd Frederick Linder, Agoura Hills, CA (US); David Angel Rodriguez, Valencia, CA (US); Jennifer Marie Deleon, Valley Village, CA (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,843

(22) Filed: Nov. 16, 2015

(65) Prior Publication Data

US 2017/0064399 A1    Mar. 2, 2017

Related U.S. Application Data

(63) Continuation-in-part of application No. 14/883,418, filed on Oct. 14, 2015, which is a continuation-in-part
(Continued)

(51) Int. Cl.
*H04N 5/445* (2011.01)
*H04L 12/58* (2006.01)
(Continued)

(52) U.S. Cl.
CPC .............. *H04L 51/24* (2013.01); *H04L 51/04* (2013.01); *H04L 67/26* (2013.01);
(Continued)

(58) Field of Classification Search
CPC ............. H04N 21/2187; H04N 21/232; H04N 21/25841; H04N 21/2743
(Continued)

(56) References Cited

U.S. PATENT DOCUMENTS 7,912,908 B2 * 3/2011 Cai .......................... H04L 51/12
370/354
8,452,887 B1 * 5/2013 Stier ................ H04N 21/25866
709/206

(Continued)

OTHER PUBLICATIONS

Jabara et al., U.S. Appl. No. 14/838,062 entitled "System and Method for Live Video Streaming,". filed Aug. 27, 2015. 29 pages.
(Continued)

*Primary Examiner* — Pankaj Kumar
*Assistant Examiner* — Sahar Aqil Riaz
(74) *Attorney, Agent, or Firm* — Davis Wright Tremaine LLP; Michael J. Donohue

(57) ABSTRACT

A message distribution technique permits individual subscribers to receive text messages from a broadcaster. The broadcaster uploads a text message to a central processing service where it may be redirected to a chat room associated with the broadcaster. In addition, a push notification is sent to all subscribers of a particular broadcaster to indicate the delivery of a text message from the broadcaster. The push notification may also contain a link that, when activated by the subscriber, initiates an associated software application program that navigates the subscriber directly to the chat room to view the text message. The text message may be generated and uploaded by the broadcaster without having to activate the software application. The push notification may also be received by subscribers without having to activate the software program. In one embodiment, the broadcaster can limit distribution of the video based on a geographic restriction.

20 Claims, 6 Drawing Sheets

Related U.S. Application Data of application No. 14/838,062, filed on Aug. 27, 2015.

(51) Int. Cl.
| | | |
|---|---|---|
| *H04L 29/08* | (2006.01) | |
| *H04N 21/258* | (2011.01) | |
| *H04N 21/488* | (2011.01) | |
| *H04N 21/2743* | (2011.01) | |
| *H04N 21/2187* | (2011.01) | |
| *H04N 21/232* | (2011.01) | |

(52) U.S. Cl.
CPC ... *H04N 21/25841* (2013.01); *H04N 21/2743* (2013.01); *H04N 21/4882* (2013.01); *H04N 21/2187* (2013.01); *H04N 21/232* (2013.01)

(58) Field of Classification Search
USPC .............................................. 725/41, 46, 50
See application file for complete search history.

(56) References Cited

U.S. PATENT DOCUMENTS

| | | | | |
|---|---|---|---|---|
| 8,667,075 | B1* | 3/2014 | King | H04N 21/2187 |
| | | | | 709/206 |
| 9,042,923 | B1* | 5/2015 | Mirho | H04W 4/14 |
| | | | | 455/412.1 |
| 9,800,836 | B2 | 10/2017 | Kiraz | |
| 9,819,987 | B2 | 11/2017 | Reddy | |
| 2003/0037110 | A1* | 2/2003 | Yamamoto | H04M 3/5322 |
| | | | | 709/204 |
| 2007/0030973 | A1 | 2/2007 | Mikan | |
| 2008/0034040 | A1* | 2/2008 | Wherry | G06Q 10/107 |
| | | | | 709/204 |
| 2008/0098005 | A1* | 4/2008 | Goradia | G06F 16/9535 |
| 2008/0108299 | A1* | 5/2008 | Hullot | H04M 1/72544 |
| | | | | 455/3.01 |
| 2008/0195712 | A1* | 8/2008 | Lin | G06F 3/0486 |
| | | | | 709/206 |
| 2009/0042622 | A1* | 2/2009 | Tsui | H04M 19/04 |
| | | | | 455/567 |
| 2009/0276500 | A1* | 11/2009 | Karmarkar | H04L 51/38 |
| | | | | 709/206 |
| 2010/0009661 | A1* | 1/2010 | Zhu | H04L 51/38 |
| | | | | 455/412.1 |
| 2010/0017280 | A1* | 1/2010 | Davis | G06Q 30/02 |
| | | | | 705/14.4 |
| 2010/0251304 | A1 | 9/2010 | Donoghue | |
| 2011/0009093 | A1* | 1/2011 | Self | H04W 76/45 |
| | | | | 455/411 |
| 2011/0041148 | A1 | 2/2011 | Pipenbrink | |
| 2012/0303834 | A1* | 11/2012 | Adam | H04L 65/4084 |
| | | | | 709/231 |
| 2013/0033971 | A1* | 2/2013 | Stier | H04N 21/25866 |
| | | | | 369/1 |
| 2013/0172026 | A1* | 7/2013 | Odell | H04L 51/046 |
| | | | | 455/466 |
| 2013/0211919 | A1* | 8/2013 | Doherty | G06Q 30/0267 |
| | | | | 705/14.64 |
| 2013/0260796 | A1 | 10/2013 | Hasek | |
| 2013/0332543 | A1* | 12/2013 | Shin | H04L 51/14 |
| | | | | 709/206 |
| 2014/0011481 | A1 | 1/2014 | Kho | |
| 2014/0047074 | A1 | 2/2014 | Chung | |
| 2014/0062696 | A1 | 3/2014 | Packard | |
| 2014/0114963 | A1* | 4/2014 | Jurascheck | G06F 17/30 |
| | | | | 707/723 |
| 2015/0026714 | A1 | 1/2015 | Yuan | |
| 2015/0081488 | A1 | 3/2015 | Turner | |
| 2015/0143216 | A1 | 5/2015 | Huang | |
| 2015/0201313 | A1* | 7/2015 | Celik | H04M 1/72519 |
| | | | | 455/414.1 |
| 2015/0242875 | A1 | 8/2015 | Stachowski | |
| 2015/0271534 | A1 | 9/2015 | Altman | |
| 2015/0324897 | A1* | 11/2015 | Venters, III | G06Q 30/02 |
| | | | | 705/14.51 |
| 2015/0334061 | A1 | 11/2015 | Baird | |
| 2016/0037126 | A1* | 2/2016 | Polyakov | H04N 7/147 |
| | | | | 348/14.02 |
| 2016/0080807 | A1 | 3/2016 | Trimper | |
| 2016/0094883 | A1 | 3/2016 | Tidwell | |
| 2016/0119262 | A1* | 4/2016 | Siegel | H04L 51/06 |
| | | | | 709/206 |
| 2016/0134740 | A1 | 5/2016 | Gal | |
| 2016/0149967 | A1 | 5/2016 | Lewis | |
| 2016/0150268 | A1 | 5/2016 | Barablin | |
| 2016/0156988 | A1 | 6/2016 | Tam | |
| 2016/0182734 | A1 | 6/2016 | Bianco | |
| 2016/0182947 | A1 | 6/2016 | Chittella | |
| 2016/0191588 | A1 | 6/2016 | Shafer | |
| 2016/0219024 | A1* | 7/2016 | Verzun | H04L 9/34 |
| 2016/0234160 | A1 | 8/2016 | Bhupati | |
| 2016/0253599 | A1 | 9/2016 | Lang | |
| 2016/0381163 | A1 | 12/2016 | Mashtakov | |
| 2017/0046944 | A1 | 2/2017 | Namazi | |

OTHER PUBLICATIONS

Jabara et al., U.S. Appl. No. 14/883,418, entitled "System and Method for Video Streaming to a Geographically Limited Subscriber Set," filed Oct. 14, 2015. 33 pages.

Jabara et al., U.S. Appl. No. 14/949,341 entitled "System and Method for Customized Message Delivery." filed Nov. 23, 2015. 37 pages.

Jabara et al., U.S. Appl. No. 14/970,359 entitled "System and Method for Video Streaming to a Geographically Limited Set of Viewers" filed Dec. 15, 2015. 47 pages.

International Search Report and Written Opinion dated Nov. 22, 2016, in US2016/048052, filed Aug. 22, 2016, 11 pages.

* cited by examiner

SYSTEM AND METHOD FOR CUSTOMIZED MESSAGE DELIVERY

CROSS REFERENCE OF THE RELATED APPLICATIONS

This application is a continuation-in-part of U.S. patent application Ser. No. 14/883,418, filed Oct. 14, 2015, which is a continuation-in-part of U.S. patent application Ser. No. 14/838,062, filed Aug. 27, 2015, the disclosures of which are incorporated by reference herein in their entirety.

BACKGROUND OF THE INVENTION

Field of the Invention

The present disclosure relates generally to video streaming and, more particularly, to a system and method for live video streaming using push technology.

Description of the Related Art With improvements in wireless network technology and computer network technology, video streaming has become commonplace. Almost all smartphones manufactured today include video cameras. Similarly, laptop computers, tablet computers, and similar devices also include video cameras. These various devices can access computer networks, such as the Internet, user can easily send and receive image data and video data.

Service providers, such as YouTube, LLC, allow users to upload video data for viewing by others. Users wishing to watch a YouTube video navigate to the website and select a video for downloading. Other video service providers may include a link to guide users to a website where they may view a selected video.

Celebrities may have a large fan base that follow the celebrity on various forms of social media, such as Twitter, Instagram, and the like. Celebrities may also upload video data for retrieval by fans. While some forms of social media, such as Twitter, allow a fan to receive messages from a celebrity, there is a desire to follow celebrities as they perform certain activities. What is needed is a system and method that sends live video streaming to the celebrity fan base. The present invention provides this, and other advantages, as will be apparent from the following detailed description and accompanying figures.

DETAILED DESCRIPTION OF THE INVENTION

The present disclosure is directed to a system and method that allows a celebrity to upload a video clip for automatic distribution to subscribers. As will be described in greater detail below, subscribers may pay a service fee to automatically receive the streaming video clips from one or more celebrities. When a particular celebrity uploads a video, the uploaded video is automatically distributed to the subscriber list for that celebrity. In addition, each subscriber will receive a push notification indicating the impending delivery of a video clip. Although referred to herein as a "video" clip, those skilled in the art will appreciate that the video is typically accompanied by an audio track. As used herein the term "video" is intended to encompass a video-only clip as well as a combined video and audio clip.

Figure 1:
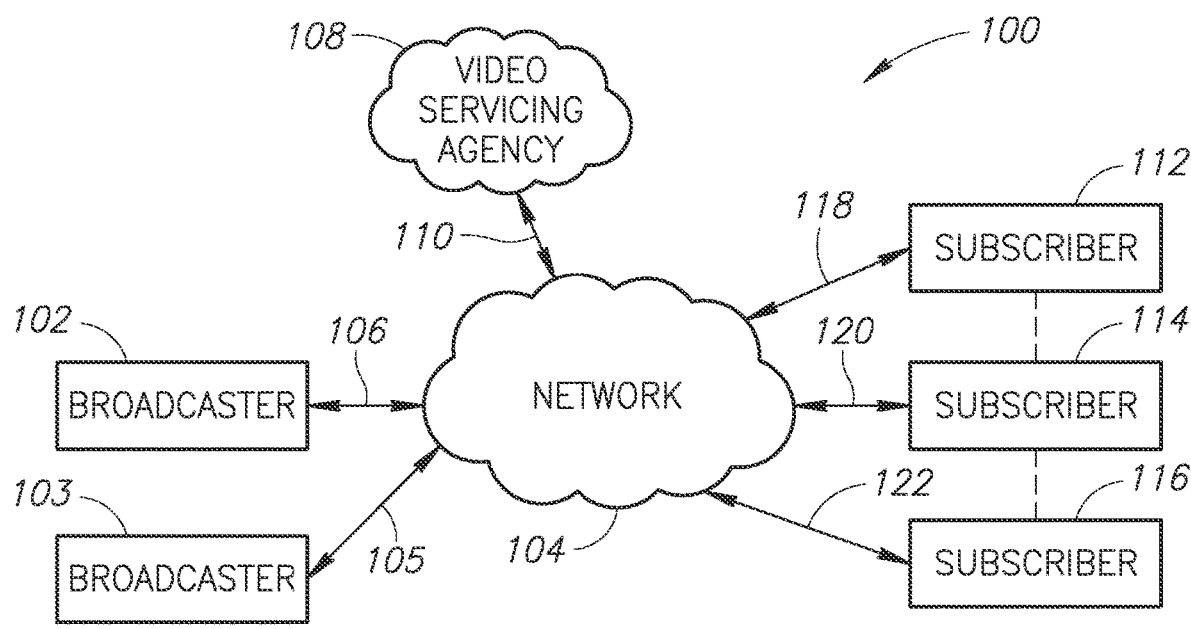
FIG. 1 illustrates an exemplary environment of a system architecture used to implement the present teachings.

FIG. 1 illustrates a system architecture used to implement a system 100 in accordance with the present teachings. As will be described in greater detail below, any individual who has a sufficient subscriber following may be eligible to broadcast video clips. Those individuals, whether they are sports figures, actors, television personalities, or the like, will be referred to herein as broadcasters. This term is intended to indicate that those individuals have a sufficient fan base that they are eligible to broadcast videos.

FIG. 1 illustrates the communication device of a broadcaster 102 and a broadcaster 103. Although FIG. 1 illustrates only two broadcasters (i.e., the broadcasters 102-103), the system 100 provides for a large number of broadcasters. For the sake of clarity, the system illustrated in FIG. 1 illustrates only two broadcasters. The communication devices for the broadcaster 102-103 can be any device capable of video recording and having a computer network connection. This includes, but is not limited to, smartphones, laptop computers, tablets, and the like. In FIG. 1, the broadcaster 102 is coupled to a network 104 via a communication link 106 while the broadcaster 103 is coupled to the network 104 via a communication link 105. In an exemplary embodiment, the network 104 may be the Internet. The communication links 105-106 are intended to depict a broad variety of network connections that may be possible. For example, if the device of the broadcaster 102 is a smartphone, the communication link 106 may be a cellular communication link (e.g., 3G, 4G, LTE, or similar telecommunications network technology). A typical smartphone also includes Wi-Fi and Bluetooth capabilities. If the broadcaster 102 utilizes these capabilities to connect to the network 104, the communication link 106 may be an appropriate wireless communication link. In yet another embodiment, the broadcaster 102 may be coupled to the network 104 using a wired connection, such as Ethernet. In this embodiment, the communication link 106 is an Ethernet connection. Other known connection technologies may be used for various communication links described herein. In addition, the communication link 106 may be provided by an Internet service provider (not shown). In this embodiment, the broadcaster 102 is coupled to the network 104 via a communication link 106 provided by the Internet service provider. In addition, the communication link 106 may represent multiple forms of communication links, such as a wireless link, wired link, or combination thereof. The system 100 is not limited by the form of any communication link.

Also illustrated in FIG. 1 is a video servicing agency 108. As will be described in greater detail below, the video servicing agency 108 may be a single computer server or a cloud computer server, is illustrated by the surrounding cloud in FIG. 1. In this embodiment, the video servicing agency 108 may be distributed throughout geographic regions. The video servicing agency 108 is coupled to the network 104 via a communication link 110. As discussed above with respect to the communication link 106, the communication link 110 may be satisfactorily implemented by one or more known network connection technologies.

FIG. 1 also illustrates a number of communication devices for subscribers 112-116. Although FIG. 1 illustrates a small number of subscribers 112-116, a popular celebrity may include tens of thousands or millions of followers. For the sake of clarity, a system 100 will be explained with respect to a single broadcaster 102 and a small number of subscribers 112-116, but with the understanding that the system and method may be readily scaled to include a much larger number of broadcasters and subscribers. Similar to the broadcaster 102, the communication devices for the subscribers 112-116 may be implemented using, by way of example, smartphones, desktop computers, laptops, tablets, or the like. The subscribers 112-116 are coupled to the network 104 via respective communication links 118-122. As noted above, the communication links 118-122 may be implemented by one or more of a variety of known network connection technologies. One or more of the subscribers 112-116 may use a cellular connection to access the network 104.

As will be described in greater detail below, the broadcaster 102 establishes a video session with the video servicing agency 108 and uploads a video clip. The video servicing agency 108 sends a push notification to any of the subscribers 112-116 that has subscribed to the live video broadcasts of the broadcaster 102. When the video clip is received from the broadcaster 102, the video servicing agency 108 distributes the video to the subscribers of the live video service.

Figure 2:
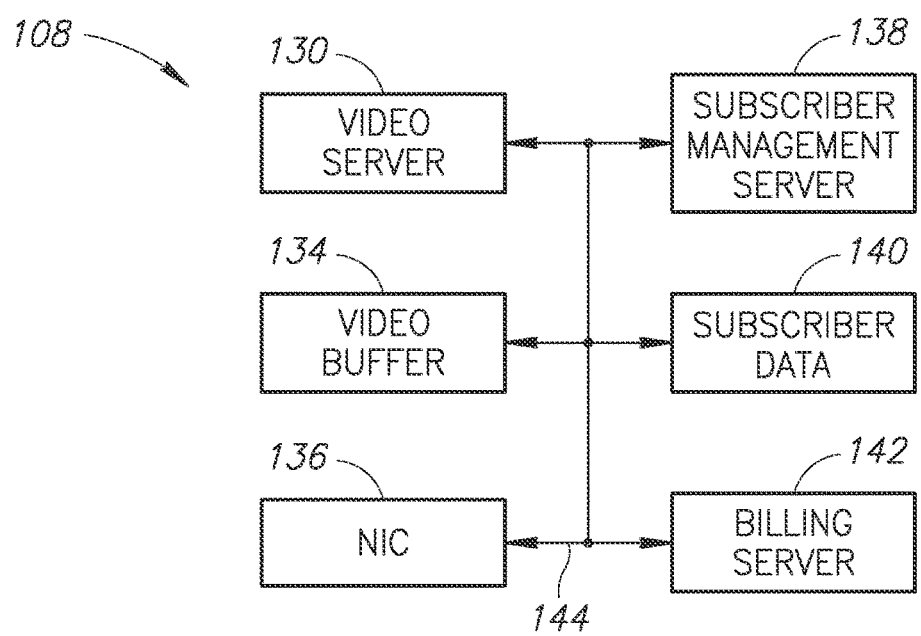
FIG. 2 is a functional block diagram of the video server of FIG. 1.

FIG. 2 is a functional block diagram of the video servicing agency 108. The video servicing agency 108 controls the uploading and distribution of videos from the broadcaster 102 (see FIG. 1). In addition, the video servicing agency 108 provides subscriber management and billing functions. As will be described in greater detail below, each broadcaster 102 may have a large number of fans that follow the broadcaster on one or more forms of social media, such as Facebook, Twitter, Vine, Instagram, or the like. Even though fans may be followers of the broadcaster 102 on one or more of these social media networks, those individuals may not be paying subscribers for purposes of live video delivery. A LiVideo™ service is one in which subscribers pay to follow one or more broadcasters. For example, one broadcaster 102 may charge $0.99 per month to each subscriber to their LiVideo™ service while another broadcaster may charge $1.99 for its LiVideo™ service. As will be described in detail below, the video servicing agency 108 identifies the broadcaster 102 and matches the subscription list with that broadcaster to provide distribution of the uploaded video as well as the push notification message.

The video servicing agency 108 includes a video server 130 that will handle any processing or transcoding of the video from a format delivered by the broadcaster 102 to a format suitable for widespread distribution via the network 104. The video server 130 handles all aspects of video signal processing. The video server 130 may be typically implemented by a conventional server computer. Conventional components of the video server 130, such as a central processing unit, memory, data storage, and communication interfaces are known in the art and need not be described in greater detail herein. Those skilled in the art will appreciate that many different data formats may be satisfactorily employed to upload video data from the broadcaster 102 and for streaming from the video servicing agency 108 to the subscribers 112-116. The particular format used by the broadcaster 102 may be dependent on the particular device used by the broadcaster and/or the type of network connection available on the communication link 106. Similarly, data formats, such as real time protocol (RTP) could be used by the video servicing agency 108 to stream to the subscribers 112-116. However, RTP may drop data packets resulting in an unpleasant viewing experience. In one embodiment, the video server 130 receives the video clip from the broadcaster 102 and transcodes the video from its native format to HTTP live streaming (HLS), which is a known streaming media communications protocol.

The video servicing agency 108 of FIG. 2 also includes a video buffer 134, which may be part of the video server 130. The video buffer 134 receives and temporarily stores the uploaded videos provided by one or more of the broadcasters 102 until they are distributed to the subscribers 112-116. The video buffer 134 may also temporarily store the iranscoded video in the HLS format for distribution to the subscribers 112-116. The buffering function is also utilized to help improve the quality of the video delivered to the subscriber.

The video servicing agency 108 also includes one or more network interface controllers (NICs) 136 to control communications between the video servicing agency and the network 104. As previously discussed, the video servicing agency 108 may be a centralized computing system with relatively few NICs 136 or may be a distributed cloud-based system requiring a large number of NICs 136. The particular form of each NIC 136 depends on the nature of the communication link 110 between the video servicing agency 108 and the network 104.

The video servicing agency 108 also includes a subscriber management server 138 to handle subscriber enrollment and other management functions. As noted above, a subscriber may subscribe to one or more broadcasters. The subscriber management server 138 controls the creation and management of subscriber lists and storage of subscriber data in a subscriber data storage area 140. The subscriber data storage area 140 stores subscriber information in association with the particular broadcasters 102 for which the subscriber has signed up and paid the appropriate subscription fee. The subscriber data storage area 140 would typically include an email address, residential address, mobile phone number and the like. Those skilled in the art will appreciate that the subscriber data storage area 140 also contains data linking each subscriber to one or more broadcasters (e.g., the broadcaster 102). For example, each subscriber profile may include a data field identifying the broadcasters associated with each particular subscriber. Other common database implementations can be used satisfactorily to implement the subscriber data storage area 140 and to create a link between broadcasters and subscribers.

In addition to registration information, the client management server 138 may also perform the function of a data analytics server to analyze subscriber profiles and subscriber activities. For example, subscriber social media pages may be available to the client management server 138 and provide information such as favorite musicians, favorite sports teams, favorite movies, and the like. Social media pages also provide background information, such as schools attended, job information, and the like. The client management server 138 can analyze this data to create its own profile of the subscriber that can be used to generate targeted advertising for the subscriber.

In addition, the client management server 138 can monitor subscriber activities. For example, the client management server 138 can monitor which profile pages of broadcasters 102 that a subscriber visits, including details such as number of visits, length of visits, and the like. The client management server 138 can use the activity data in conjunction with the social media data and user profile data to create its own user profile. Those skilled in the art will appreciate that such data analytics are presently known in the art and may be provided by a third-party source.

The video servicing agency 108 also includes a billing server 142. In one embodiment, the billing server 142 may be implemented by a third-party service, such as PayPal or Apple Pay. The third-party intermediary allows billing without the subscribers 112-116 having to provide credit card information to sign up as a subscriber for various broadcasters 102. Other third-party intermediary payment services may also be satisfactorily employed as the billing server 142. In another embodiment, the billing server 142 may be directly handled in the video servicing agency 108. In this embodiment, the subscribers 112-116 would provide credit card and billing information to allow direct billing for the LiVideo™ subscriptions selected by each subscriber.

One skilled in the art will appreciate that the various servers illustrated in the video servicing agency 108 may be combined. For example, the video server 130 and the subscriber management server 138 may be implemented by a single computing device. Similarly, the subscriber management server 138 and the billing server 142 (if implemented directly in the video servicing agency 108) may be implemented by a single computing device. In yet another embodiment, the video server 130, the subscriber management server 138 and the billing server 142 may be implemented by a single computing device having sufficient computing power. The various servers are illustrated as separate blocks in FIG. 2 because each has a separate functionality. The various components in the video servicing agency may be coupled together by a bus system 144. In one embodiment, the various components of the video servicing agency 108 may be collocated and the bus system 144 is an internal bus or part of a local area network (LAN). However, as noted above, the video servicing agency 108 may be a cloud implemented service. In this embodiment, some components may be coupled together by a LAN implementation of the bus system 144 while other components of the video servicing agency may be coupled together via the network 104 and the bus system 144 may include portions of the network.

Figure 3:
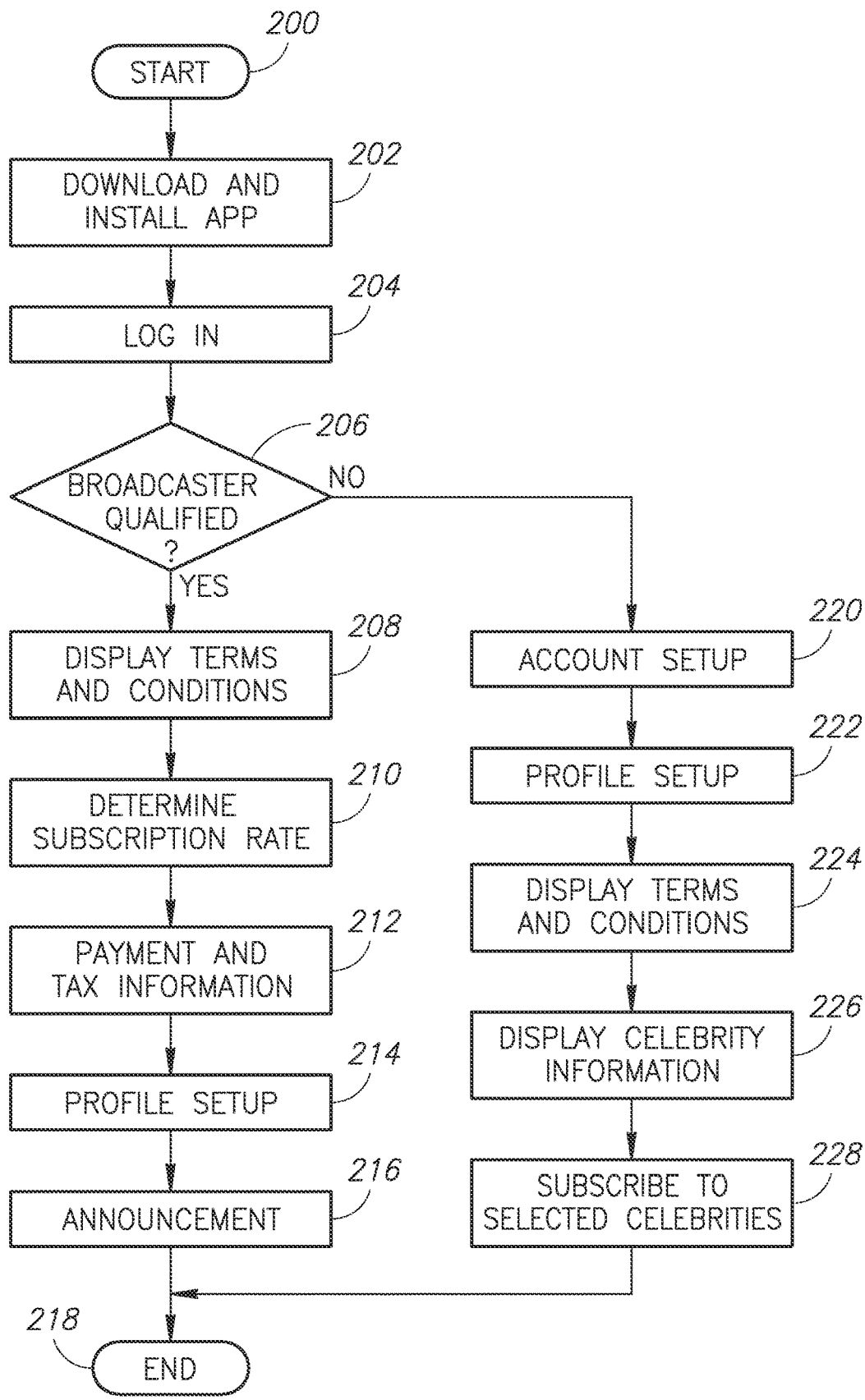
FIG. 3 is a flowchart illustrating a process for login and account setup in accordance with the present disclosure.
Figure 4:
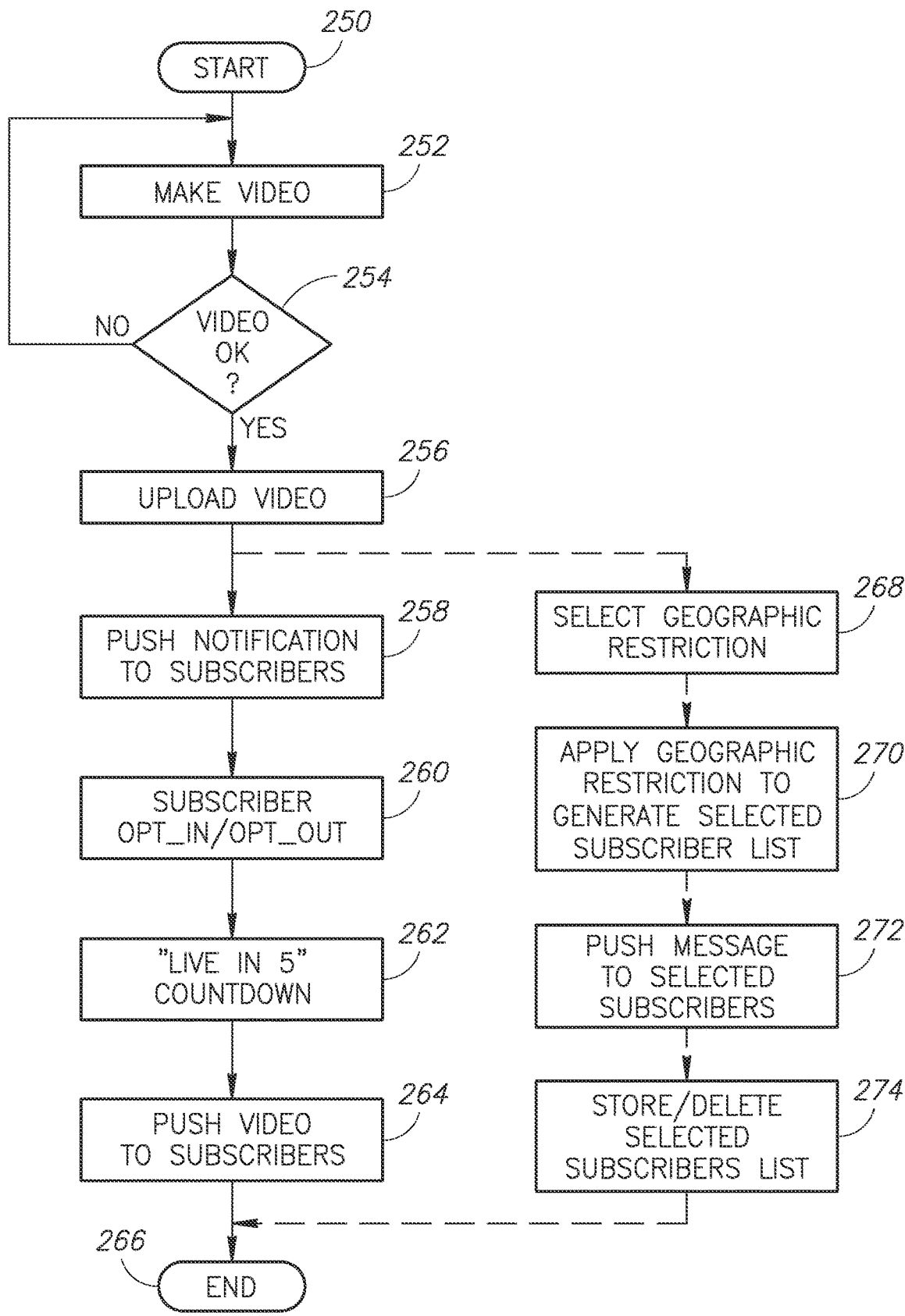
FIG. 4 is a flowchart illustrating the process of uploading a video to the video server of FIG. 1.
Figure 5:
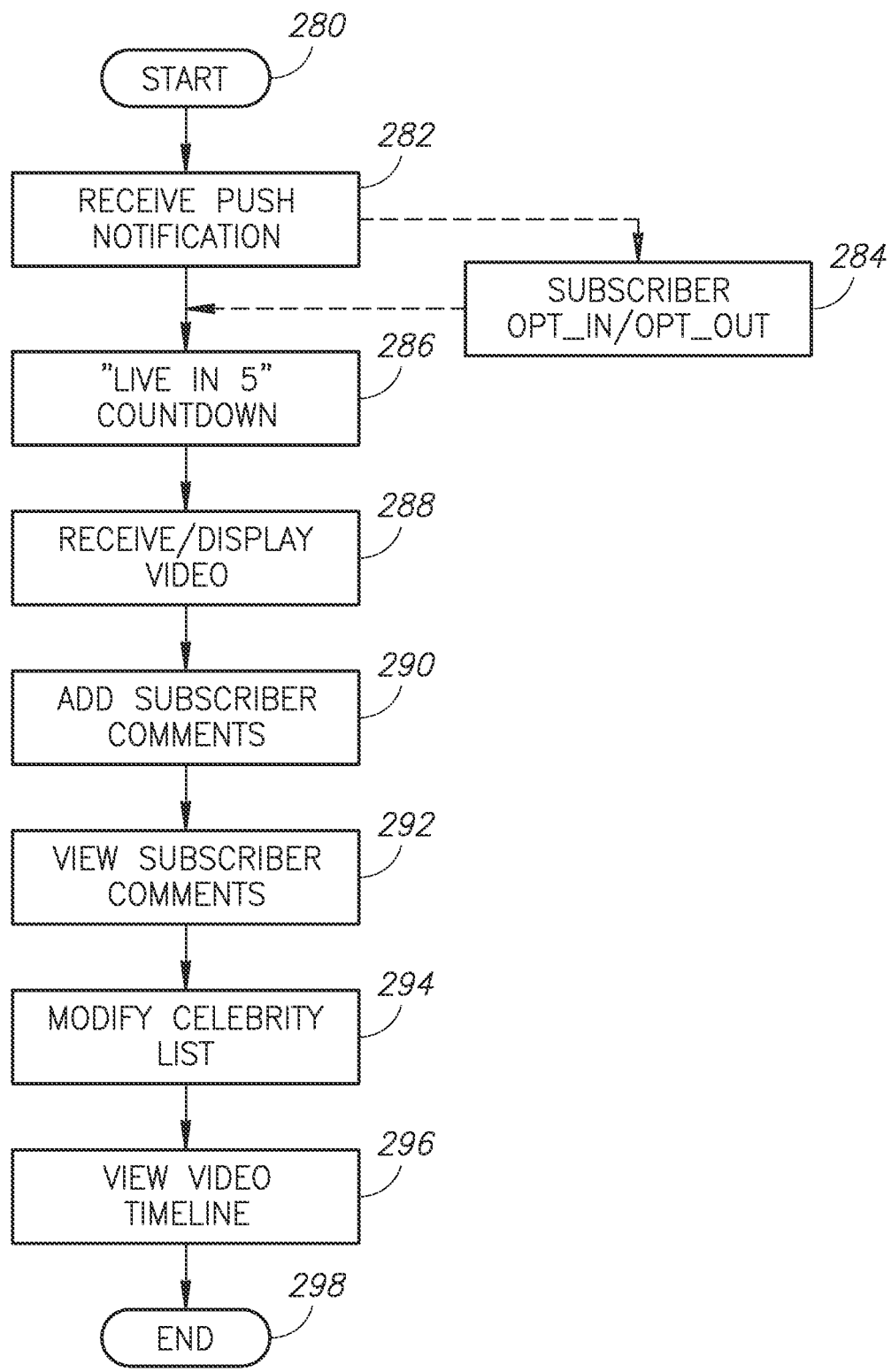
FIG. 5 is a flowchart illustrating the distribution of an uploaded video to a subscriber list in accordance with the present disclosure.

The operation of the system 100 may now be explained in more detail with respect to the flowcharts of FIGS. 3-5. In FIG. 3, at a start 200, it is assumed that the devices of both broadcasters and subscribers have not had the relevant software installed. At step 202, the users (i.e., both broadcasters and subscribers) download and install a software application program on the respective communication devices. In step 204, all parties log in. The log in screen includes an option to log in as either a viewer (i.e., an individual that will subscribe to one or more celebrities to thereby follow the live video broadcasts of the celebrity) or a broadcaster (i.e., an individual that has met the minimum social media follower requirements imposed by the service provider). In response to selecting the "Broadcaster" button, a broadcaster will confirm through a social media log in that they have met the minimum criteria for followers.

In decision 206, the system 100 determines whether the individual user is qualified as a broadcaster. In one embodiment, an individual is qualified as a broadcaster if they have a sufficient fan base. The fan base may be measured by the data provided by various social media websites. For example, the individual may sign in with Facebook, Twitter, Vine, Instagram, or the like. Each of these social media websites has a form of data indicating the number of followers. For example, Facebook permits the designation of individuals as "friends." Other social media websites may include the designation of "followers," "subscribers," or the like. When an individual signs in using a social media website, the number of followers can be automatically determined. If the number of followers is above a predetermined threshold, the individual is qualified as a broadcaster. For example, the system 100 may require that an individual have at least 20,000 followers to qualify as a broadcaster. If the individual is qualified as a broadcaster, the result of decision 206 is YES and, in step 208, the system may display the terms and conditions of operation for the broadcaster (e.g., the broadcaster 102 of FIG. 1). The system 100 may also enable an embodiment of the software for a broadcaster that is different from that of a subscriber. The broadcaster version of the software will provide rate charging information as well as payment and tax information for the broadcaster. The subscriber version of the application software need not include such features, but does include a list of celebrities and associated rates charged by each celebrity for the LiVideo™ service.

In step 210, the broadcaster 102 may determine an appropriate subscription rate. For example, the broadcaster 102 may wish to charge subscribers a nominal fee, such as $0.99 per month to each subscriber that will receive the videos created by the broadcaster. A different broadcaster may choose to charge $1.99 per month for their subscribers. After the selection of the subscription rate in step 210, the system 100 may provide optional payment and Lax information to the broadcaster 102 in step 212. This information indicates the frequency and manner of payment for subscribers as well as relevant tax information.

In step 214, the broadcaster establishes a profile. Those skilled in the art will appreciate that the profile set up may include provision of personal and professional information, as well as other information that may be of general interest to the broadcaster's fan base. This may also include image data and stored video data that a fan may access as a subscriber to the broadcaster 102.

In addition, the system 100 may provide for an optional announcement message in step 216. The announcement message may be a text message, image data, audio message and/or video message transmitted through the system 100 or transmitted via the various social media websites on which the subscriber 102 is active. For example, the announcement 216 may be sent to friends, followers, subscribers, and the like of the various social media websites. The announcement could be a message to various social media websites urging followers to use the LiVideo™ services to see the latest video. The announcement information may also include subscriber information, subscriber rate information, as well as information on subscribing to the live video service.

After the profile is established, the broadcaster 102 can look at statistical data related to viewers and subscribers. This may include, for example, data related to the total number of views of the broadcaster's profile page, the number of unique views of the broadcaster's profile page, and the like The information may be provided to the broadcaster using a broadcaster version of the application program installed in step 202, provided using a link to a data reporting website or in the form of a soft or hard copy report periodically provided to the broadcaster. The broadcaster initial setup process ends at 218.

If the viewer is not qualified as a broadcaster, the result of decision 206 is NO and, in step 220, the system 100 provides an account set-up step for individuals that are designated as subscribers or viewers (i.e., not eligible as broadcasters). In the account set up, the individual include log in information with email address and phone number or provides log in information through a social media account.

This information may be used to verify the phone number of the individual and to provide a text verification code that the user must enter in order to verify the authenticity of the user. For example, the account set-up step 220 allows for the transmission of a SMS text message to the user-entered mobile number. The user enters the text verification code to confirm the user's identity and phone number. The system 100 will not proceed if the user-entered text verification code does not match the text verification code transmitted to the user's smart phone. The SMS text confirmation code is typically only used during the initial account set-up and need not be repeated every time a viewer logs in to the system 100.

In step 222, the system allows an individual viewer to perform a profile set up. As with the profile set up (step 214) for the broadcaster, the profile set up for individual users may include image data, video data, and other personal information. The system 100 can provide a blank form for completion by the viewer. In addition to log-in information, mobile phone number, an e-mail address, residential address, user name, password, and the like, the user can provide information used by broadcasters or the service provider for targeted advertising and merchandising. For example, based on the user profile, or subscription selections, the system 100 may provide subscription suggestions (e.g., "based on your profile, you like comedy; you should subscribe to . . . ).

There could be pushes of data to subscribers based on information in the subscriber profile, or based on subscriber behavior gathered during periods of use of the LiVideo™ software application program. For example, if a subscriber has viewed the profile of a celebrity ten time in the recent past, the LiVideo™ software application program can track this usage suggest subscribing to the particular celebrity. In one embodiment, the software application program could provide a discount to the subscriber and/or provide a link to a location that simplifies subscribing to the celebrity. In another example, the LiVideorm software application program may track a subscriber's viewing activity with several celebrities, or subscription to several celebrities, that may indicate interest in a particular genre. The software application program can suggest other celebrities in the same genre and/or offer discounts (e.g., first month free or discount on the first month or discount if you subscribe to multiple celebrities in that genre.

Following the profile set up, the system 100 displays terms and conditions for viewers in step 224. The system 100 may also display a calendar of events to guide the user in the selection of upcoming videos.

In step 226, the system 100 displays celebrity information for the viewer. In one embodiment, the system can provide categories of available celebrities and allow the viewer to the select celebrities in individual categories. For example, categories may include actors, sports figures, politicians, celebrities, and the lice. The user can click on each category to view a list of broadcasters in the user-selected category. The list of celebrities may also include the rate information for each celebrity.

In step 228, the viewer may subscribe to selected celebrities. For example, the viewer may select a celebrity to follow simply by clicking on a checkbox. The subscription process in step 228 also includes a payment process. As discussed above, the system 100 may employ existing third-party payment services, such as PayPal or other known third-party payment services. Alternatively, the system may provide for payment services handled directly by the video servicing agency 108 (see FIG. 1), For any type of payment service, the user must provide credit card and billing information (e.g., name, billing address, expiration date, security code, and the like). The viewer may subscribe to other celebrities in a similar fashion. The system 100 also provides for editing of the celebrity list to add or delete subscriptions at a later date. Following the subscription to one or more selected celebrities in step 228, the set up and log in process ends at 218.

When a viewer subscribes to a particular celebrity, the subscriber management server 138 (see FIG. 2) adds the user data and celebrity information to the subscriber data storage area 140. This will permit the automatic distribution of videos to all subscribers for a particular broadcaster 102. In addition, subscriber information is provided to the billing server 142 to set up a billing procedure for the individual viewer for each selected celebrity.

FIG. 4 illustrates a process of uploading a video by the broadcaster 102. At a start 250, the subscriber 102 (see FIG. 1) has already established an account and profile with the video servicing agency 108. In addition, the video servicing agency 108 already has a list of subscribers for each particular broadcaster 102.

In step 252, the broadcaster 102 creates a video. The system 100 may permit videos of virtually any length. However, most fans are interested in only a short duration video. Accordingly, in one embodiment, the video may be limited to a convenient length such as a 30 second or 60 second video clip. In decision 254, the broadcaster 102 may determine if the video is satisfactory. If something in the video clip was unsatisfactory to the broadcaster 102, they may reject the video and the result of decision 254 is NO. In this case, the system 100 returns to step 252 to remake the video.

If the video is acceptable to the broadcaster 102, they may approve. In this case, the result of decision 254 is YES and, in step 256, the broadcaster 102 uploads the video clip to the video servicing agency 108.

In step 258, the video servicing agency 108 pushes a notification to all of the subscribers for the particular broadcaster 102 indicating that a video clip is about to be downloaded to the subscriber. The push notification may be triggered by the broadcaster sending a message to the video servicing agency 108 about an impending upload of a video clip, or may be automatically triggered by some event, such as activation of the video device on the communication device for the broadcaster 102. The push notification message may also be triggered by the beginning of the upload of the video clip to the video servicing agency 108.

As described above, the video server 130 in the video servicing agency 108 performs any necessary transcoding to create a video clip for distribution to subscribers using the HLS protocol or other conventional protocol that optimizes video delivery and overall system performance. The transcoded video clip may be stored temporarily in the video buffer 134 until the distribution to the subscribers 112-116.

The system 100 provides for a variety of user-selected options. In one embodiment, the subscriber may wish to receive the push notification and determine whether or not to receive the video dip from the broadcaster 102. The subscriber may wish to receive the push notification and determine whether or not to receive the video clip on a case-by-case basis. This may be referred as an opt-in option where the subscriber must provide a positive indication of the desire to receive the video dip. In one embodiment, the user may swipe an icon on the touch screen of the communication device to indicate acceptance of the impending video dip. If the subscriber does not provide the positive indication (i.e., the opt-in notification), the video servicing agency 108 will not send the video dip to that subscriber.

If the subscriber wishes to view the video dip, but did not respond within some predetermined time limit, it may be possible to view the remaining video dip midstream, or to view the video dip in its entirety even though it may be slightly time delayed. In an alternative embodiment, the video dip is streamed to subscribers and is not stored on the video server 130 (see FIG. 2) for later delivery. In this embodiment, the user must swipe the icon (i.e., provide the opt-in notification) within a brief time period, there is no opportunity to view the video when it is delivered to other subscribers.

The system 100 also provides for a subscriber opt-out option in step 260. In this option, the viewer has provided an indication of the desire to automatically receive incoming video dips from the celebrities to which the subscriber has subscribed. To receive the incoming video dip, the subscriber need not perform any action. That is, the video clip is automatically streamed to the subscriber. If the subscriber does not wish to receive a particular video clip for some reason (e.g., it is an inconvenient time to view the video clip), the subscriber may slide an icon on the touch display of the subscriber's communication device to reject incoming videos on a case-by-case basis. The opt-in and opt-out options may be selected by the user during the account set up of step 222 (see FIG. 3) or profile set up of step 222. The subscriber may also edit and viewing options to switch from opt-in to opt-out or vice versa by editing the account or profile information.

In yet another alternative embodiment, the operator of the system 100 may select the opt-in or opt-out option as a default operational mode. In this embodiment, the subscriber cannot choose between the opt-in and opt-out modes of operation. For example, by downloading and installing the application program on the user device, the user effectively agrees to automatically receive video clips for any broadcaster for which the user is a subscriber. In this embodiment, the user need not take any action to receive a video clip. The video clips are automatically delivered and displayed on the user device without any human interaction by the user.

In step 262, the subscriber receives a "Live in 5" countdown message to indicate that the incoming video will be arriving in approximately five seconds. In one embodiment, this message may include an actual number countdown until the streaming video arrives. In step 264, the video servicing agency 108 pushes the video to all subscribers of the broadcaster 102 based on the opt-in and opt-out selections made by the subscriber. The process ends at 266.

In an alternative embodiment, the broadcaster 102 may wish to limit distribution to a select group of subscribers. In one variation, it may be desirable to limit distribution on the basis of geography. For example, if the broadcaster 102 is making an appearance in a particular geographic area, such as a particular venue, city, state or the like, an announcement of the appearance need not be distributed to the entire subscriber list for that broadcaster 102. Instead, the subscriber management server 138 (see FIG. 2) can, in effect, filter the subscriber list to generate a selected subscriber list of targeted subscribers. This feature provides a degree of exclusivity between the broadcaster and the targeted group of subscribers.

In one embodiment, the broadcaster (e.g., the broadcaster 102) may send an announcement only to the subscribers of the particular broadcaster based on some geographical limitation. In an alternative, the broadcaster (e.g., the broadcaster 102) may send an announcement to the subscribers of one or more other broadcasters (e.g., the subscribers of broadcaster 103) based on the same geographical limitation, For example, the broadcasters (e.g., the broadcasters 102-103) may be musicians on the same record label, the same nationality, or may be in the same musical genre such that the subscribers of one broadcaster may be interested in a different broadcaster. Thus, the decision to include subscribers of another broadcaster that meet the geographical limitations may be based on subscriber profiles or based on marketing analysis of subscriber interests or subscriber activities. For example, the subscriber data storage area 140 may have one or more data fields indicating broadcaster profiles viewed by the subscriber that indicate subscriber interests. The selection of a subscriber may also be based on tracking information indicating the presence of the subscriber in the geographical area of interest.

In yet another alternative, the subscriber data storage area 140 may contain profile information for an individual who is not yet a subscriber to any broadcasters. These individuals may be thought of as subscribers in the sense that they have downloaded and installed the LiVideo™ software application program and have entered user data, such as an email address, residential address, mobile number, or the like. If the non-subscriber meets the geographic limitation described above, they may be included on the filtered subscriber list. The non-subscriber may be identified based on the profile data provided by the non-subscriber or based on marketing analysis of non-subscriber interests or non-subscriber activities, such as profiles of one or more broadcasters that have been viewed by the non-subscriber. The selection of a non-subscriber may also be based on tracking information indicating the presence of the non-subscriber in the geographical area of interest. This approach may provide a useful marketing tool that encourages a non-subscriber to subscribe to one or more broadcasters.

This is illustrated by the optional steps in the flowchart of FIG. 4 where at step 268, the broadcaster 108 selects a geographic limitation. In step 270, the subscriber management server 138 (see FIG. 2) applies the geographic restriction to the subscriber list for the particular broadcaster 108 to generate a selected subscriber list. In step 272, the video is pushed to the selected subscriber list rather than to the entire subscriber list. In step 274, the subscriber management server 138 can be configured to store or delete the selected subscriber list. Those skilled in the art will appreciate that other steps in the flowchart of FIG. 4 can also be executed in this embodiment. For example, the push notifications of step 258 could be used to send notifications text messages to the select subscribers.

In one example, the subscriber data 140 may include residential information about the subscribers. If a particular subscriber is from the particular city where the appearance is scheduled, they can be added to the selected subscriber list. Furthermore, if the subscriber lives within a predetermined distance of the city where the appearance is scheduled (e.g., a fifty mile radius), they can be added to the selected subscriber list.

In another alternative, the present location of subscribers can be dynamically determined and those subscribers presently in the city where the appearance is scheduled, or within a predetermined distance of the city where the appearance is scheduled, can be added to the selected subscriber list.

Many applications, such as a map application, include location-based services where the user's present location is determined and transmitted to a central location. A typical smartphone, such as the subscriber 112 of FIG. 1, includes a Global Positioning System (GPS) receiver (not shown) that can determine the subscriber's present location with great accuracy. The GPS location data, often in the form of latitude and longitude data, can be periodically transmitted by the subscriber 112 to the video servicing agency 108 for processing by the subscriber management server 138. Alternatively, the subscriber 112 may respond to a location query by the subscriber management server 138 and provide GPS location data in response to the query.

In yet another alternative, the software application downloaded to the wireless devices of the subscribers can obtain the device identification and device tracking information to provide location data to the subscriber management server 138. In one example, the software can track the cell and sector in which the wireless communication device is currently located. Other device tracking techniques are known in the art and can be satisfactorily used to determine the current location of the subscribers.

Many smartphone applications give the subscriber control over location-based services. That is, the subscriber can elect not to permit transmission of location data. If the subscriber elects not to permit the use of location-based services, that subscriber has opted out and will not be included in the selected subscriber list and will not receive any video related to the scheduled appearance of the broadcaster 108 even if that subscriber is presently in the geographic region where the appearance is scheduled.

The subscriber, can, however, still possibly receive the video if other information is used by the subscriber management server 138, such as the subscriber's profile data, which may include such information. In one embodiment, the subscriber must agree to opt in and permit location-based services to download the software application for LiVideo™ service. In yet another embodiment, the LiVideo™ software application program can provide a pop up a menu when initially opened with an opt-in-opt-out option to provide location information for the subscriber. In yet another implementation, the location information is part of the LiVideo™ software application program without the option of a subscriber opt-in or opt-out selection.

In operation, the broadcaster 108 can include geographic and time limitation data along with uploaded video in step 256 of FIG. 4. The geographic data can be a city, county, or even a specific venue and can be selected from a map or a list presented to the broadcaster 102. The subscriber management server 138 uses this geographical information to generate the selected subscriber list in step 270. In step 272, the message (e.g., the video clip) is pushed to the selected subscribers in the manner discussed above with respect to videos to all subscribers.

Those skilled in the art will appreciate that the selected subscriber list can be dynamically generated based on the geographic information provided by the broadcaster 102. The subscriber management server 138 (see FIG. 2) can generate the selected subscriber list when the video is uploaded from the broadcaster 102 to the video buffer 134. The selected filter list can be discarded immediately after the video is pushed to the selected subscribers, as illustrated in step 274. Alternatively, the selected subscriber list may be temporarily stored by the video servicing agency 108. For example, the selected subscriber list can be stored until the appearance has actually occurred. This approach can simplify transmission of follow-up video messages from the broadcaster 108 to subscribers on the selected subscriber list.

Although the generation of a targeted subscriber list is described with respect to the delivery of a video clip, those skilled in the art will appreciate that the message delivered to the targeted subscribers can be in other formats, such as an audio message, or a text message. An audio message is delivered in essentially the same manner as described for a video clip in the flowchart of FIG. 4. The broadcaster 102 (see FIG. 1) generates an audio message (step 252) and uploads it to the video servicing agency 108 (step 256). Steps 268-274 are performed in the same manner for the audio clip message as they would be performed for the video clip message.

A text message can also be processed in the same manner. The video clip and audio clip delivery described above utilize the software application program downloaded and installed on the subscriber devices (step 202 of FIG. 3). In a similar fashion, the broadcaster 102 can upload a text message to the video servicing agency 108 for delivery to targeted subscribers using the application program.

Alternatively, the text message could be delivered to the video servicing agency 108 using the software application program downloaded and installed on the broadcaster mobile device or uploaded to the video servicing agency using a conventional short messaging service (SMS). The text message received by the video servicing agency 108 can be delivered to the targeted subscriber list using the software application program, as described above with respect to video and audio clips, or delivered to the targeted subscribers using SMS. The video servicing agency 108 can retrieve the mobile numbers from the subscriber data 140 for each of the subscribers on the selected subscriber list and deliver the broadcaster message using SMS.

FIG. 5 is a flowchart illustrating the reception and display of videos on the subscriber device. At a start 280, the subscriber has downloaded the appropriate application software, described in FIG. 3, and has subscribed to one or more broadcasters 102.

At step 282, the subscriber receives a push notification (transmitted by the video servicing agency in step 258 of FIG. 4). In step 284, the optional opt-in and opt-out process may be performed by the user. That is, if the subscriber has selected an opt-in option, the subscriber must actively indicate the desire to receive the video clip. Alternatively, if the subscriber has selected the opt-out option during account set up, step 284 need not be performed to receive the video clip.

In step 286, the subscriber receives the "Live in 5" countdown message and in step 288, the subscriber receives and displays the video transmitted by the broadcaster 102. Once the system 100 has begun delivery of the video clip, the incoming video data stream contains the necessary data to interact with the previously installed software application program so that the incoming video clip effectively "owns the screen." That is, the display and audio interfaces on the subscribers communication device are under the operational control of the incoming data stream.

The system 100 permits subscribers to add subscriber comments in step 290 and to view other subscriber comments in step 292. In step 290, the subscriber may provide commentary on the broadcaster 102 in general and/or commentary on the particular video clip. These comments can be scrolled and will be seen by other subscribers of a particular broadcaster that are also viewing a particular video clip at approximately the same time. In one embodiment, subscribers may indicate approval of another's comment. The indication of a large scale approval may cause a subscriber comment to bubble up to the top of the subscriber comments.

The system 100 permits subscribers to modify their celebrity list in step 294. This permits the subscriber to add or delete broadcasters 102 from their subscription list. Any changes to the subscription list are processed by the subscriber management server 138 (see FIG. 2) and the revised data stored in the subscriber data storage area 140. The changes to the celebrity lists are also provided to the billing server 142 so that the billing may be altered accordingly.

In one alternative embodiment, the system 100 can provide a video timeline for viewing in step 296. The video timeline 296 can include past video clips for a predetermined period of time (e.g., one minute, one hour, 12 hours, one day, etc.) as well as a schedule of upcoming future scheduled video clips. In one embodiment, the video timeline can include video clips only for the broadcasters 102 for which an individual has already subscribed. In an alternative embodiment, the video timeline can include video clips may be a complete list that includes recently distributed video clips and scheduled future video clips from all broadcasters 102. The video clips may be provided free of charge to the subscriber or be used as inducement for the subscriber to add additional broadcasters to their list. The process ends at 298.

A system and method has been described for delivering broadcaster video messages to one or more subscribers using the video servicing agency 108 illustrated in FIG. 1. In another embodiment, the system 100 can be configured to deliver text messages to the subscribers (e.g., the subscribers 112-116). In the embodiment illustrated in FIG. 6, the video servicing agency 108 has been expanded in functionality and is referred to as a message servicing agency 308. The message servicing agency 308 can perform all of the functions described above with respect to the video servicing agency 108 (see FIG. 1) with respect to video streaming to subscribers and video streaming to a geographically limited subscriber set.

Figure 6:
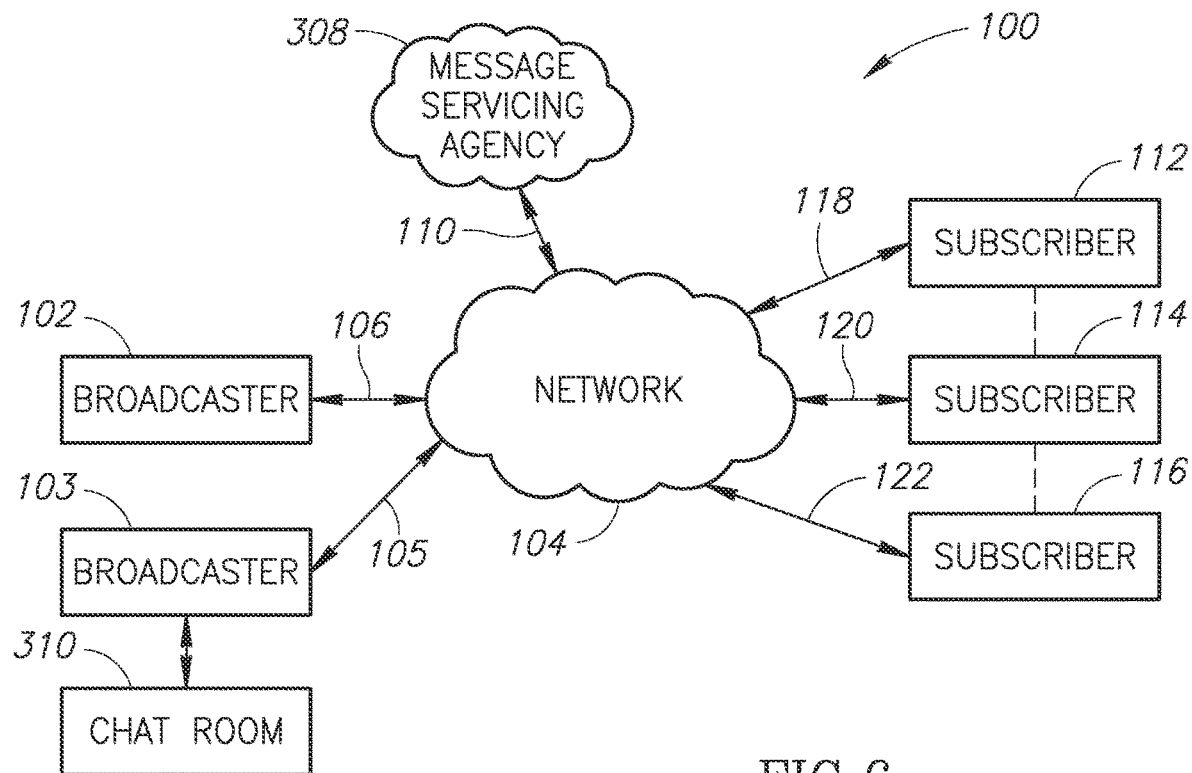
FIG. 6 illustrates an alternative embodiment of a system architecture used to implement the present teachings.

In the embodiment illustrated in FIG. 6, the message servicing agency 308 can deliver text messages to subscribers. In one embodiment, the text message is generated by the broadcaster using the native text messaging capability on the broadcaster's smart phone. This permits the broadcaster to generate text messages for subscribers without having to activate the software application program, as described above. The text message is directed to a predetermined telephone number that will cause the text message to be redirected to the message servicing agency 308.

In one embodiment, the message servicing agency 308 may send text messages directly to the smart phones of each of the subscribers (e.g., the subscribers 112-116) using the cell phone numbers of the individual subscribers. Again, this process may use the native text messaging capability of the smart phones of each of the subscribers 112-116. This approach also avoids any need for activating the software application program.

In an alternative embodiment, FIG. 6 illustrates a chat room 310 associated with the broadcaster 103. Although the chat room 310 is illustrated in FIG. 6 as coupled to the broadcaster wireless device, that is merely to indicate the association of the chat room 310 with the broadcaster 103. In a typical embodiment, the chat room 310 is supported on a server (not shown) coupled to the network 104. In this embodiment, the message servicing agency 308 receives the text message from the broadcaster 103 and redirects the text message to the chat room 310 associated with the broadcaster. Subsequently, the message servicing agency 308 pushes a notification to each of the subscribers 112-116 to advise them of the availability of a new text message in the chat room 310 of the broadcaster 103. The use of notifications in smartphones is well known in the art and need not be described herein. The subscribers may then manually navigate to the chat room 310 to view the text message and to reply to the text message or provide commentary on the text message, as is frequently done in a chat room.

In yet another alternative, the push notification message from the message servicing agency 308 may be an interactive notification that automatically moves the subscriber to the chat room 310. The use of interactive notifications is also well known. In this embodiment, the subscribers 112-116 receive the push notification message and may activate the interactive notification to automatically navigate to the chat room 310 to view the text message.

The interactive notification in the push notification message may be in any convenient form to permit easy activation by the subscribers. For example, the link may include a "swipe" feature that allows the subscriber to swipe the touch screen display to thereby activate the the software application program and automatically navigate to the chat room 310. In an alternative embodiment, the link may require a double-tap on the screen by the subscriber to activate the link and automatically navigate to the chat room 310. Other conventional forms of link activation may also be satisfactorily employed with the interactive push notification messages. Activation of the interactive push notification will automatically start the software application program described above and automatically take the subscriber to the chat room 310 to view the text message from the broadcaster 103.

As is conventional with chat rooms, the subscriber may reply to the text message and provide a comment related to the text message. Replies and commentaries are entered by the subscriber in a conventional fashion that need not be described herein. Other subscribers in the chat room 310 may see the original text message from the broadcaster 103 as well as replies and comments from any other subscribers.

Figure 7:
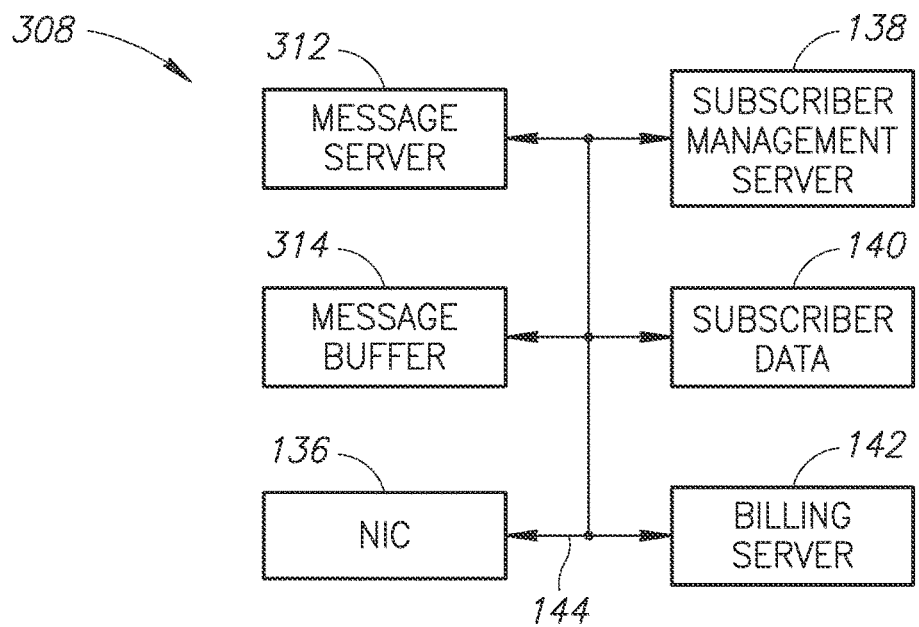
FIG. 7 is a functional block diagram of the message servicing agency of FIG. 6.

FIG. 7 illustrates a functional block diagram of the message servicing agency 308. The message servicing agency 308 includes certain elements that are similar in operation to elements described in FIG. 2. For the sake of brevity, those common components need not be described again.

When the broadcaster 103 uploads a text message, it is temporarily stored in the message buffer 314. The message server 312 handles delivery of the text message to the subscribers. In one embodiment, described above, the message server 312 may transmit individual text messages directly to the subscribers 112-116 (see FIG. 6). In alternative embodiment, the message server 312 directs the text message to the chat room 310 associated with the broadcaster 103. In this embodiment, the message server 312 pushes a notification message to the subscribers 112-116. As those skilled in the art appreciate, the MC 136 provides an interface to the network and controls the actual communication.

Figure 8:
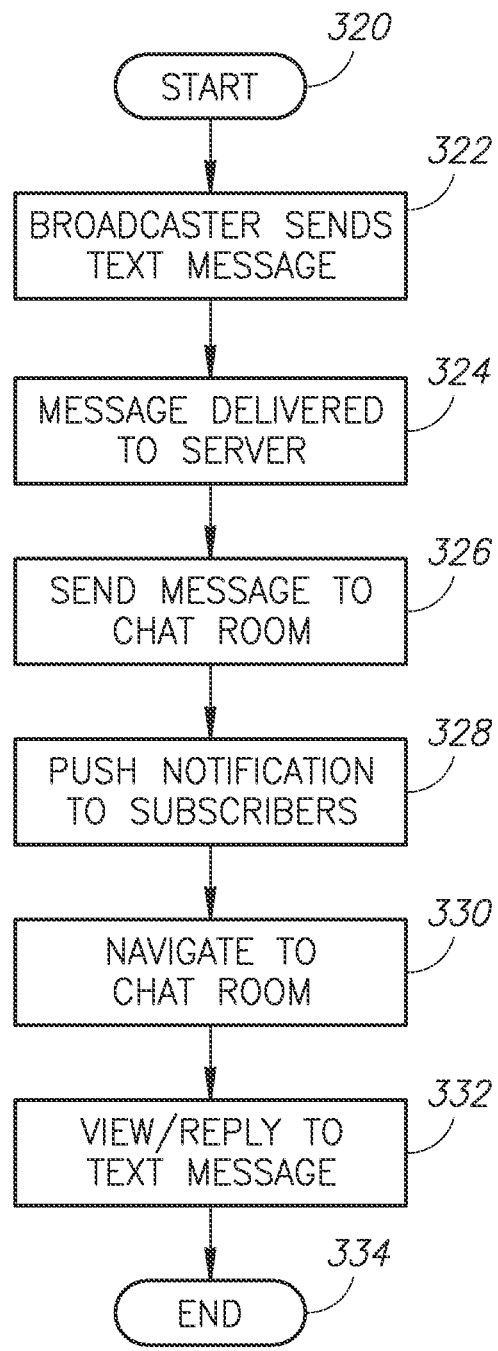
FIG. 8 is flow chart illustrating the operation of an exemplary embodiment of the system of FIG. 6.

FIG. 8 is a flow chart illustrating the operation of the embodiment of FIG. 6. At a start 320, the broadcaster 103 has already set up the chat room 310. In step 322, the broadcaster sends a text message. As noted above, the text message may be directed to a pre-determined telephone number using the native text messaging capabilities of the broadcasters smartphone. In step 324, the message is delivered to the video servicing agency 308 and may be temporarily stored in the message buffer 314 for processing by the message server 312.

In step 326, the message server 312 send the text message to the chat room 310 associated with the broadcaster 103. In step 328, the message server 312 pushes a notification message to the subscribers 112-116. The interactive notification allows the notification recipient to respond in a simple manner. In the present case, the interactive notification permits the subscriber to open the application program and to navigate the the chat room 310 of the subscriber 103 to thereby view the text message. In step 330, the subscriber device has navigated to the chat room 310. This may be done manually by the subscriber or automatically via the interactive notification described above.

In step 332, the subscriber may view the text message and reply to the text message or enter comment related to the text message. As noted above, subscriber replies and comments may be viewed by other subscribers that are in the chat room 310. The process ends at 334.

A mechanism for limiting subscribers to a pre-determined geographic area has been described above with respect to streaming videos. However, this same geographic filtering may be applied to text messaging as well. In this embodiment, the optional steps 268-274 in the flow chart of FIG. 4 may be applied to text messaging by the message server 312 to generate a selected subscriber list. Thus, a text message may be readily generated by the broadcaster and distributed to the subscribers in an automated fashion. The broadcaster may generate and upload a text message without having to activate the software application program. In one embodiment, subscribers receive the text message directly from the message servicing agency 308 and do not need to activate the software application program. In another embodiment, the text message is directed to the chat room 310 and a push notification sent to subscribers that may include an active link to easily activate the software application program and automatically direct the subscriber to the chat room 310.

Thus, the system and method described herein allow celebrities to broadcast live or near real-time videos to their fans on a subscription service basis. The video dips are streamed to a centralized location and distributed to the subscribers along with an advance notice text message indicating the video will follow in a short time frame. This allows celebrities to maintain close connections with their fan base and to keep the celebrity in the public eye.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method comprising:
generating a text message using a broadcaster wireless communication device;
the broadcaster communication device transmitting a short messaging (SMS) text message to a predetermined telephone number using a native text messaging feature of the broadcaster communication device without activating a software application program installed on the broadcaster communication device;
redirecting the SMS text message from the predetermined telephone number to a message servicing agency for transmission to a mobile communication device associated with each of a plurality of subscribers as a SMS text message;
retrieving a subscriber list associated with the broadcaster; and
the message servicing agency transmitting the uploaded text message to each of the plurality of subscribers on the subscriber list using a telephone number of each of the plurality of subscribers to send the uploaded text message to the mobile communication device associated with each of the plurality of subscribers as a SMS text message.

2. The method of claim 1 wherein uploading the text message comprises transmitting the message from the broadcaster communication device to the predetermined telephone number and redirecting the text message from the predetermined telephone number to the message servicing agency, the message servicing agency redirecting the text message to a chat room associated with the broadcaster.

3. The method of claim 2, further comprising transmitting a notification message to the mobile communication device associated with each of the plurality of subscribers, the notification message including a link to permit the communication device of any of the plurality of subscribers on the subscriber list to be directed to the broadcaster chat room to view the text message.

4. The method of claim 3 wherein the broadcaster chat room accepts comments and replies from the subscriber communication device, the comments and replies being available for viewing by any of the plurality of subscribers.

5. The method of claim 1 wherein the subscriber list includes geographic data related to each of a plurality of subscribers on the subscriber list;
a server applying a geographic filter function to the subscriber list to generate a geographically filtered subscriber list; and
transmitting the SMS text message only to subscribers on the geographically filtered subscriber list.

6. The method of claim 5 wherein the broadcaster selects a geographic region and uploads data to the server to indicate the selected geographic region selection wherein the server applies the geographic filter function to the subscriber list based on the uploaded data indicating the selected geographic region selection to generate the geographically filtered subscriber list.

7. The method of claim 6 wherein the server generates the geographically filtered subscriber list such that subscribers within a predetermined distance of the geographic region are included in the filtered subscriber list.

8. The method of claim 5, further comprising the server receiving location information from a communication device of each of the plurality of subscribers wherein the geographic data related to subscribers on the subscriber list comprises the received location information for each subscriber, the server using the received location information to apply the geographic filter function to the subscriber list.

9. A computer-implemented method comprising:
receiving, at a predetermined telephone number, a short messaging service (SMS) text message generated by a broadcaster wireless communication device and transmitted to the predetermined telephone number by the broadcaster wireless communication device;
retrieving a subscriber list associated with the broadcaster, the subscriber list including a telephone number of a communication device of each respective one of the plurality of subscribers; and
providing the subscriber list associated with the broadcaster to a messaging servicing agency and redirecting the received text message to the message servicing agency for transmission as a SMS text message to the communication device of each of the plurality of subscribers on the subscriber list associated with the broadcaster wherein the text message received by the predetermined telephone number is transmitted as a SMS text message from the broadcaster communication device to the predetermined telephone number using a native text messaging feature of the broadcaster communication device without activating a software application program installed on the broadcaster wireless communication device.

10. The method of claim 9, wherein the server redirects the received text message to the message servicing agency, the message servicing agency redirecting the text message to a chat room associated with the broadcaster, the method further comprising transmitting a notification message to the mobile communication device associated with each of the plurality of subscribers, wherein the notification message includes a link to permit the communication device of any of the plurality of subscribers on the subscriber list to be directed to a broadcaster chat room to view the text message.

11. The method of claim 10 wherein the broadcaster chat room accepts comments and replies from the subscriber communication device, the comments and replies being available for viewing by any of the plurality of subscribers.

12. The method of claim 9 wherein the subscriber list includes geographic data related to each of a plurality of subscribers on the subscriber list;
the server applying a geographic filter function to the subscriber list to generate a geographically filtered subscriber list; and
transmitting the SMS text only to subscribers on the geographically filtered subscriber list.

13. A system for text message distribution using a short messaging service (SMS) text messaging; comprising:
a predetermined telephone number configured to receive a short messaging service (SMS) text message transmitted from a broadcaster wireless communication device to the predetermined telephone number using a native text messaging feature of the broadcaster wireless communication device without activating a software application program installed on the broadcaster communication device;
a data storage structure containing a subscriber list associated with the broadcaster, the subscriber list including information for each of a plurality of subscribers on the subscriber list, including a telephone number for a communication device of each respective subscriber on the subscriber list; and
a message servicing agency server receiving the SMS text message redirected from the predetermined telephone number and further receiving the subscriber list information and transmitting the text message to each of the plurality of subscribers on the subscriber list wherein the text message transmitted to the predetermined telephone number by the broadcaster communication device is generated by the broadcaster communication device as a SMS text message using a native text messaging feature of the broadcaster communication device.

14. The system of claim 13 wherein the message servicing agency redirects the text message to a chat room associated with the broadcaster.

15. The system of claim 14 wherein the notification message includes a link to permit the communication device of any of the plurality of subscribers on the subscriber list to be directed to the broadcaster chat room to view the text message.

16. The system of claim 15 wherein the broadcaster chat room accepts comments and replies from the subscriber communication device, the comments and replies being available for viewing by any of the plurality of subscribers.

17. The system of claim 13 wherein the subscriber list includes geographic data related to each of a plurality of subscribers on the subscriber list;
the server being further configured to apply a geographic filter function to the subscriber list to generate a geographically filtered subscriber list; and
the server being configured to transmit the SMS text message only to subscribers on the geographically filtered subscriber list.

18. The system of claim 17 wherein the broadcaster selects a geographic region and uploads data to the server to indicate the selected geographic region selection wherein the server is configured to apply the geographic filter function to the subscriber list based on the uploaded data indicating the selected geographic region selection to generate the geographically filtered subscriber list.

19. The system of claim 18 wherein the server generates the geographically filtered subscriber list such that subscribers within a predetermined distance of the geographic region are included in the filtered subscriber list.

20. The system of claim 17 wherein the server is further configured to receive location information from the communication device of each of the plurality of subscribers wherein the geographic data related to subscribers on the subscriber list comprises the received location information for each subscriber, the server using the received location information to apply the geographic filter function to the subscriber list.

* * * * *